United States Patent [19]

Perron et al.

[11] 3,957,909

[45] May 18, 1976

[54] ABS POLYMERS WITH SYNTHETIC HYDROCARBON RESINS

[75] Inventors: Peter James Perron, Pompton Plains; Joseph Leopold Schafer, Teaneck, both of N.J.

[73] Assignee: Dart Industries Inc., Los Angeles, Calif.

[22] Filed: Mar. 3, 1975

[21] Appl. No.: 554,842

[52] U.S. Cl. .......................... 260/876 R; 260/887; 260/880 R
[51] Int. Cl.$^2$ .......................................... C08L 55/02
[58] Field of Search ......... 260/876 R, 880 R, 876 B

[56] References Cited
UNITED STATES PATENTS

| | | | |
|---|---|---|---|
| 3,010,936 | 11/1961 | Irvin | 260/876 R |
| 3,073,798 | 1/1963 | Baer | 260/876 R |
| 3,773,609 | 11/1973 | Haruta et al. | 161/182 |
| 3,784,587 | 1/1974 | Chambers | 260/876 B |
| 3,862,068 | 1/1975 | Russell | 260/27 |
| 3,880,953 | 4/1975 | Downey | 260/876 B |

FOREIGN PATENTS OR APPLICATIONS

| | | |
|---|---|---|
| 531,202 | 10/1956 | Canada |

*Primary Examiner*—Wilbert J. Briggs, Sr.
*Assistant Examiner*—Thurman K. Page
*Attorney, Agent, or Firm*—Fred S. Valles; Bryant W. Brennan; Margareta LeMaire

[57] ABSTRACT

ABS compositions of improved impact strength are obtained by adding thereto controlled amounts of a synthetic hydrocarbon resin having a ring and ball softening point of at least 70°C and derived from deeply cracked petroleum stocks.

9 Claims, No Drawings

ABS POLYMERS WITH SYNTHETIC HYDROCARBON RESINS

BACKGROUND OF THE INVENTION

This invention relates to high impact resistant thermoplastic compositions containing acrylonitrile-butadiene-styrene (ABS) resins.

Acrylonitrile-butadiene-styrene resins are well known thermoplastic polymers useful in a variety of applications where resin properties such as impact strength, ready moldability, tensile strength and modulus, hardness, stability, surface gloss of the finished article and the like are important. Numerous processes have been developed for preparation of such resins including emulsion, bulk, solution and suspension polymerization and a combination of these techniques. In all these processes which are all well known in the art, styrene and acrylonitrile are graft copolymerized onto a butadiene rubber backbone, such as a butadiene homopolymer or a rubbery copolymer of butadiene and another comonomer, e.g. styrene. The rubber content of the graft copolymer product generally ranges from about 4 to about 60 percent by weight and the weight ratio of polymerized styrene to polymerized acrylonitrile in the copolymer grafts is generally roughly about 3:1 although other ratios may be employed.

Resin compositions comprising physical blends of the aforementioned acrylonitrile-butadiene-styrene graft copolymers with styrene-acrylonitrile copolymers, (SAN) are also well known and have acquired wide commercial acceptance. The graft copolymer component is then usually one having a relatively high butadiene rubber content and inherently a high impact strength to offset the low impact strength of the styrene-acrylonitrile copolymer component.

A disadvantage of many ABS compositions is the relatively high cost of the graft copolymer. A major contributor thereto is the raw material cost of the polybutadiene or rubbery butadiene copolymer ingredient used in the polymerization reaction. Also, since the rubber must be chemically combined, i.e. grafted, to be effective, the morphology of the butadiene, particle size, particle size distribution, particle shape and degrees of grafting and internal crosslinking must be closely controlled, and such control adds substantially to the cost.

It is obvious from the above that less than adequate control of one or more of the aforementioned variables affecting the efficiency of the rubber would result in a product having less than optimum physical properties, such as lower impact strength.

Although it is known in the prior art that the impact strength of an ABS resin especially at low temperatures can be improved by blending it with a small proportion of mineral oil, the aforementioned disadvantages are usually not overcome since the improvement in impact strength thus obtained is generally accompanied by excessive and detrimental decreases in other properties such as tensile strength and hardness, which severly limits the amount of such impact enhancers to be incorporated in the blend for either cost reduction or upgrading purposes.

It is therefore an object of the present invention to provide a high impact ABS composition having a relatively low rubber concentration.

Another object of the invention is to provide an ABS composition of improved impact strength.

Still another object of the invention is to provide an ABS composition of high quality at reduced cost.

These and other objects will become apparent from the following detailed description of the invention.

THE INVENTION

In accordance with the present invention a novel composition is provided comprising at least one acrylonitrile-butadiene-styrene graft copolymer and a synthetic hydrocarbon resin as defined below wherein the weight ratio of the butadiene rubber backbone of the graft copolymer to the hydrocarbon resin is maintained in the range from about 1.5 to about 8.

The graft copolymer component can be produced by any one of the well known techniques including solution, bulk, emulsion and suspension polymerization as well as combinations thereof, e.g. bulk-suspension polymerization, emulsion-suspension polymerization and the like. The butadiene rubber backbone of the graft copolymer may be a butadiene homopolymer or a copolymer of butadiene and another comonomer such as styrene. The particular proportions of rubber, acrylonitrile and styrene used in the preparation of the graft copolymer has no particular bearing on this invention, in other words any one of the known polymers or mixtures thereof can be used as the graft copolymer component of the blend of the present invention. It is to be understood that a certain amount of copolymer of styrene and acrylonitrile is always formed in any one of the aforementioned polymerization processes and that the products in effect are a mixture of graft copolymer and styrene-acrylonitrile copolymer.

It is also within the scope of this invention to include in the blend an additional portion of styrene-acrylonitrile copolymer which may be prepared according to any of the well known techniques therefor.

The synthetic hydrocarbon resin component of the blend is one that has a ring and ball softening point of at least 70°C and up to about 140°C or even higher. The resins are produced by polymerization of a liquid fraction from a deeply cracked petroleum stock in the presence of a suitable catalyst such as a metal halide catalyst, e.g. aluminum chloride, aluminum bromide, zinc chloride etc., or a mineral acid catalyst such as phosphoric acid or sulfuric acid.

When the liquid fraction is a low boiling cut, e.g. boiling 90% below 125°C and consisting chiefly of $C_5$-$C_7$ hydrocarbon with no appreciable quantities of polymerizable aromatic compounds, the polymerization is usually carried out with a metal halide catalyst. The hydrocarbon resin thus produced requires no further treatment. The methods of preparation of these synthetic hydrocarbons are well known in the art. One such method is described in Canadian Patent No. 531,202, hereby incorporated into this application by reference.

When the synthetic hydrocarbon resin is formed from a liquid fraction having either a higher boiling range or is a wider cut, e.g. boiling in the range from about 20°C to about 300°C such that it would contain a substantial amount of aromatics having reactive double bonds mainly at the side chains, e.g. vinyl aromatics, indenes, etc., it is required that the resin formed by polymerization be subjected to a severe hydrogenation treatment to saturate the double bonds in the aromatic rings. The methods of preparing these types of synthetic hydrocarbon resins are also well known in the art. One such method is described in U.S. Pat. No. 3,773,609 hereby incorporated into this application by reference.

Since the synthetic hydrocarbon resins are relatively light-colored in nature, no problems are encountered in the formulation of either white or pastel colored compositions.

The incorporation of the synthetic hydrocarbon resin into the blend of the invention serves two purposes. One of these is to upgrade a low impact material without seriously affecting other desirable properties of the composition. Another important function of incorporating the hydrocarbon resin in an ABS composition is that it can be used as an inexpensive replacement for a portion of the more expensive component or components of said ABS composition, while maintaining the impact strength as well as other physical properties of the composition at acceptable levels.

As mentioned above, the weight ratio of butadiene rubber to hydrocarbon resin should be not less than about 1.5 or articles prepared from the blend might delaminate. A detrimental effect upon other physical properties is usually also experienced at values below about 1.5. The preferred range is between about 2 and about 6 and in many instances most benefit is obtained within the range from about 2 to 3.

Other additives and modifiers can also be incorporated into the blend, such as stabilizers, lubricants, colorants, antistatic agents, fillers, reinforcing fibers, flame retardants etc.

The blends may be prepared by various techniques including extrusion blending, roll milling, compounding in a Banbury mixer, etc.

In order to provide a better understanding of the invention reference is had to the following illustrative examples. All parts and percentages referred to in these examples are by weight.

EXAMPLES 1–6

These comparative examples demonstrate the beneficial effect of upgrading impact strength by incorporating controlled amounts of synthetic hydrocarbon resin into an ABS composition having a relatively low impact strength, which composition was a physical blend of a suspension polymerized styrene-acrylonitrile copolymer and an emulsion graft polymerized acrylonitrile-butadiene-styrene graft copolymer product which also contained free styrene-acrylonitrile copolymer. The blend was analyzed to have a rubber content (chemically bound polybutadiene) of 21.2% and a polymerized styrene-acrylonitrile content of 78.8%, of which 10.4 % was in the form of grafts onto the polybutadiene backbone and the remaining 68.4% was present as free (ungrafted) styrene-acrylonitrile copolymer. The approximate ratio of polymerized styrene/acrylonitrile in the total SAN phase was about 74/26. The synthetic hydrocarbon resin used for Examples 2–4 was a commercial product available under the tradename Piccopale 100-SF from Hercules, Incorporated, which according to the manufacturer is of the type disclosed in the aforementioned Canadian Patent No. 531,202. The synthetic hydrocarbon resin used in Examples 5 and 6 was a commercial product available from Arakawa Forest Chemical Industries, Ltd., under the tradename Arkon P-115 and is an alicyclic resin of the type fully disclosed and identified in the aforementioned U.S. Pat. No. 3,773,609. The blends which also contained 0.4 parts antioxidant and synergist and 1.0 parts of lubricants were compounded in a Banbury, and tests were carried out on molded specimens. Also the appearance and surface gloss were determined on molded bowls prepared from the resin composition. The pertinent data are shown in Table 1. As shown, the impact strength increased remarkably with the addition of the hydrocarbon resins to the blends, however too much incorporation resulted in delamination and had a detrimental effect on the other physical properties.

TABLE I

| Experiment No. | IMPACT STRENGTH ENHANCEMENT OF ABS COMPOSITIONS | | | | | |
|---|---|---|---|---|---|---|
|  | 1 | 2 | 3 | 4 | 5 | 6 |
| Composition-% | | | | | | |
| Polybutadiene | 21.2 | 20.2 | 19.3 | 18.3 | 19.2 | 17.6 |
| Grafted SAN | 10.4 | 9.9 | 9.4 | 9.0 | 9.4 | 8.6 |
| Free SAN | 68.4 | 65.4 | 62.3 | 59.7 | 62.3 | 57.1 |
| Hydrocarbon Resin | | | | | | |
| Piccopale 100-SF | — | 4.5 | 9.0 | 13.0 | — | — |
| Arkon P-115 | — | — | — | — | 9.1 | 16.7 |
| Additives-phr | 1.4 | 1.4 | 1.4 | 1.4 | 1.4 | 1.4 |
| Ratios: | | | | | | |
| Rubber/Total SAN | 0.268 | 0.268 | 0.268 | 0.268 | 0.268 | 0.268 |
| Rubber/Hydrocarbon Resin | — | 4.49 | 2.14 | 1.41 | 2.11 | 1.02 |
| Physical Properties: | | | | | | |
| Melt Flow Rate, 230°C, 5kg | 1.1 | 1.3 | 1.8 | 4.4 | 0.6 | 0.7 |
| Notched Izod Impact-ft.lbs./inch | 2.4 | 5.5 | 6.1 | 3.6 | 6.6 | 4.3 |
| Tensile Yield Strength, psi | 5400 | 5550 | 5400 | 4970 | 4990 | 4780 |
| Rockwell "R" Hardness | 95.5 | 89.4 | 89.5 | 85.3 | 88.3 | 87.8 |
| Gloss of Molded Bowl | EXC. | EXC. | EXC. | Delaminated | EXC. | Delaminated |

EXAMPLES 7–9

These comparative examples further illustrate the advantages of the invention and particularly the effectiveness of the synthetic hydrocarbon resin as a low cost replacement for one or more of the components of the ABS composition, while still achieving enhancement or maintenance of impact strength. The chemical compositions of the blends of Examples 7 and 8 were the same as those of Examples 1 and 3 respectively, except that the emulsion polymerized graft copolymer product was from another source and had different physical properties than that of the previous examples. As shown in Table II addition in Example 8 of sufficient amount of hydrocarbon resin to result in a rubber/resin ratio of 2.14 while maintaining the rubber/total SAN ratio of Example 7 resulted in an increase in impact strength from 4.6 to 6.9. In Example 9 the proportion of graft copolymer component in the blend was reduced further as evidenced by the decrease in rubber/total SAN ratio from 0.268 to 0.233 while maintaining substantially the rubber/resin ratio of Example 8. As expected the resulting impact strength of 5.7 was not as high as that of Example 8, but still was considerably higher than that of control Example 7.

TABLE II

| IMPACT STRENGTH ENHANCEMENT OF ABS COMPOSITIONS | | | |
|---|---|---|---|
| Experiment No. | 7 | 8 | 9 |
| Composition-% | | | |
| Polybutadiene | 21.2 | 19.3 | 17.4 |
| Grafted SAN | 10.4 | 9.4 | 8.5 |
| Free SAN | 68.4 | 62.3 | 66.1 |
| Hydrocarbon Resin | — | 9.0 | 8.0 |
| Additives-phr | 1.4 | 1.4 | 1.4 |
| Ratios: | | | |
| Rubber/Total SAN | 0.268 | 0.268 | 0.233 |
| Rubber/Hydrocarbon Resin | — | 2.14 | 2.17 |
| Physical Properties: | | | |
| Melt Flow Rate, 230°C, 5kg | 0.8 | 1.3 | 1.6 |
| Notched Izod Impact-RT, ft.lb./inch | 4.6 | 6.9 | 5.7 |
| Tensile Yield Strength, psi | 5500 | 5280 | 5330 |
| Rockwell "R" Hardness | 91.5 | 85.3 | 88.8 |
| Gloss of Molded Bowl | EXC. | EXC. | EXC. |

EXAMPLES 10–15

In these examples the advantage of the invention is shown when adding the synthetic hydrocarbon resin (Piccopale — 100 SF) to low rubber content ABS resins. Two different materials were used which both were prepared by a suspension polymerization technique. The ABS material of Examples 10–12 had a 9% polybutadiene content and a polymerized styrene/acrylonitrile ratio of 72/28, while the ABS resin of Examples 13–15 contained about 11% polybutadiene rubber and the polymerized styrene/acrylonitrile ratio was 75/25. The blends, which also contained 0.45 part per hundred parts of resin of antioxidants and lubricants were prepared as before. The data are shown in Table III. The improvement in impact strength is numerically not as great as in the high rubber blends of Examples 1–14. In terms of percent improvement it is, however, substantial, being 27% for the 9% rubber ABS and 31% for the 11% rubber ABS, when the hydrocarbon resin is added at the ratio of 2.0.

TABLE III

| IMPACT STRENGTH ENHANCEMENT OF ABS COMPOSITIONS | | | | | | |
|---|---|---|---|---|---|---|
| Experiment No. | 10 | 11 | 12 | 13 | 14 | 15 |
| Composition-phr | | | | | | |
| ABS (9% rubber) | 100 | 100 | 100 | — | — | — |
| ABS (11% rubber) | — | — | — | 100 | 100 | 100 |
| Hydrocarbon Resin | — | 2 | 4.5 | — | 2 | 5.5 |
| Additives | 0.45 | 0.45 | 0.45 | 0.45 | 0.45 | 0.45 |
| Ratio: Rubber/Hydrocarbon Resin | — | 4.5 | 2.0 | — | 5.5 | 2.0 |
| Physical Properties: | | | | | | |
| Melt Flow Rate, 230°C, 5kg | 4.7 | 4.6 | 4.4 | 0.3 | 0.5 | 0.6 |
| Notched Izod Impact | 1.5 | 1.5 | 1.9 | 2.9 | 3.7 | 3.8 |
| Tensile Yield Strength, psi | 7110 | 7350 | 7240 | 5140 | 5230 | 4970 |
| Rockwell "R" Hardness | 111.3 | 111.0 | 109.0 | 98.5 | 98.6 | 93.6 |

What is claimed is:

1. A high impact thermoplastic composition comprising a blend of
    A. at least one graft copolymer of styrene and acrylonitrile copolymer grafted onto a butadiene rubber backbone and
    B. a synthetic hydrocarbon resin derived from a liquid fraction of a cracked petroleum stock and having a ring and ball softening point of at least 70°C, wherein the weight ratio of butadiene rubber to synthetic hydrocarbon resin is maintained in the range from about 1.5 to about 8.

2. The composition of claim 1 wherein said blend also contains added styrene-acrylonitrile copolymer.

3. The composition of claim 1 wherein the weight ratio is maintained in the range from about 2 to about 6.

4. The composition of claim 1 wherein the weight ratio is maintained between about 2 and about 3.

5. The composition of claim 1 wherein the graft copolymer is an emulsion polymerized resin.

6. The composition of claim 1 wherein the graft copolymer is a suspension polymerized resin.

7. The composition of claim 1 wherein the synthetic hydrocarbon resin is derived from a fraction of cracked petroleum stock said fraction boiling 90% below 125°C and being approximately devoid of polymerizable aromatics.

8. The composition of claim 1 wherein the synthetic hydrocarbon resin is a fully hydrogenated alicyclic resin derived from a fraction of a cracked petroleum stock, said fraction having a boiling point range of about 20°C to about 300°C and containing as a main component aromatic hydrocarbons having reactive double bonds mainly at the side chains.

9. The composition of claim 1 wherein the butadiene rubber backbone is a homopolymer of butadiene.

* * * * *